No. 730,060. Patented June 2, 1903.

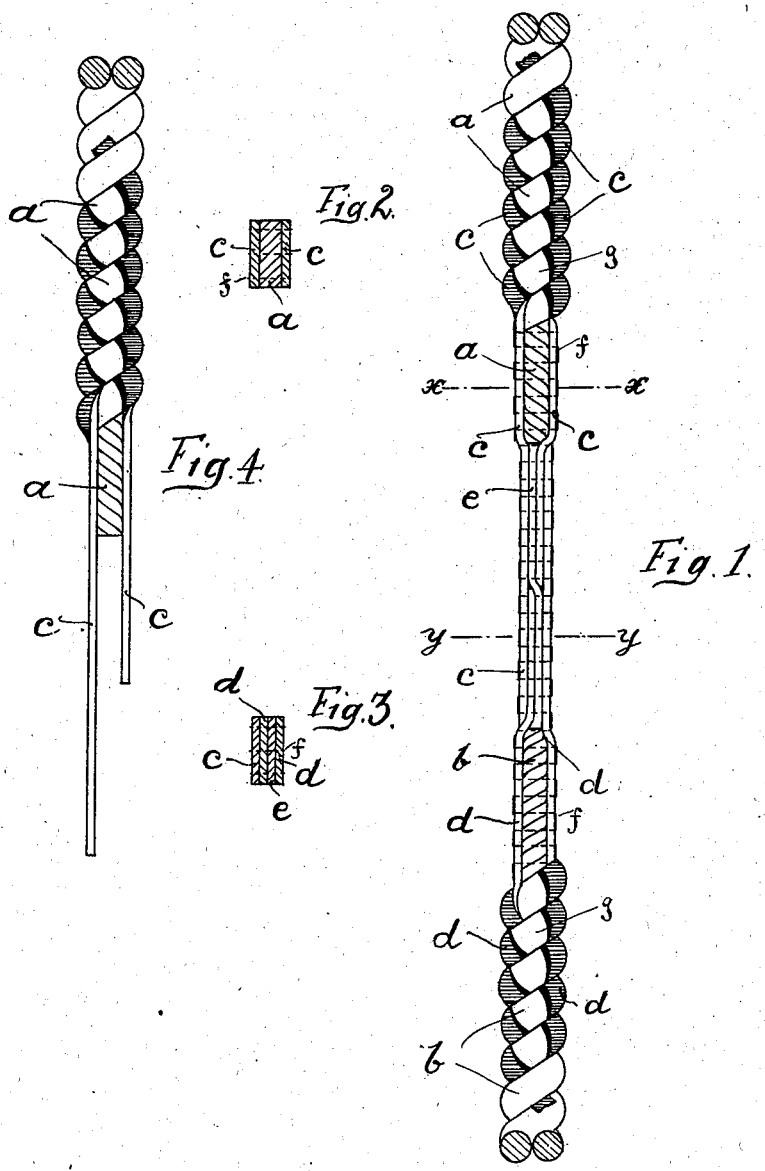

UNITED STATES PATENT OFFICE.

PAUL VOGEL, OF CRIMMITZSCHAU, GERMANY.

ROPE-SPLICE.

SPECIFICATION forming part of Letters Patent No. 730,060, dated June 2, 1903.

Application filed March 28, 1902. Serial No. 100,462. (No model.)

*To all whom it may concern:*

Be it known that I, PAUL VOGEL, a subject of the King of Saxony, residing at Crimmitzschau, in the Kingdom of Saxony, in the German Empire, have invented a certain new and useful Improvement in Rope-Splices, of which the following is a specification, reference being had therein to the accompanying drawings.

Figure 1 is a side view of the splice; Fig. 2, a cross-section taken on the line X X of Fig. 1; Fig. 3, a cross-section taken on the line Y Y of Fig. 1, and Fig. 4 a side view of one end of a rope with splicing-strips attached.

To the ends $a$ and $b$, respectively, of the rope or ropes to be united strips $c$ and $d$, which may be thongs of leather or of any other suitable material, are attached by twisting, interlacing, or plaiting with the rope-strands or in other appropriate manner. To unite the two rope ends thus provided with binding-strips $c$ $d$, the rope ends are turned or twisted back a few times and the strips $c$ $d$ laid against each other, as shown, or they may be twisted around each other and then sewed together, as indicated in the drawings by $f$, where the stitching is shown, or united in like suitable manner.

For the purpose of increasing the thickness of the splice to equal that of the rope itself and in order to augment the strength of the former one or more loose strips $e$ of suitable material may be inserted between the strips $c$ $d$, any number of which may be used.

When the splice has been made and the two rope ends (which during the operation of splicing have been rigidly held) are released, the rope will of itself return to its original position, whereby a certain amount of twist will be imparted to the strips also.

The connection of the strips to the rope may be effected partly by twisting or interlacing or plaiting the strips and strands and partly by stitching them together. In such case the extreme end of the rope should not be twisted, but plaited, in the manner, for example, as shown in the drawings at $g$.

Having thus described my invention and in what manner the same is to be carried into effect, I declare that what I claim is—

1. A rope-splice consisting of strips of material interlaced with the rope-strands at each rope end, the free ends of said strips being connected together, whereby the rope ends are united, substantially as described.

2. A rope-splice consisting of strips of material intertwined with and stitched to the strands at each rope end, the free ends of said strips being connected together, substantially as described.

3. A rope-splice consisting of strips of material intertwined with the strands at each rope end, the free ends of said strips being connected together, and filling and strengthening strips inserted between the principal strips, substantially as described.

In testimony whereof I have affixed my signature in presence of two witnesses.

PAUL VOGEL.

Witnesses:
 LEON ZEITLIN,
 B. H. WARNER, Jr.